United States Patent Office 3,592,598
Patented July 13, 1971

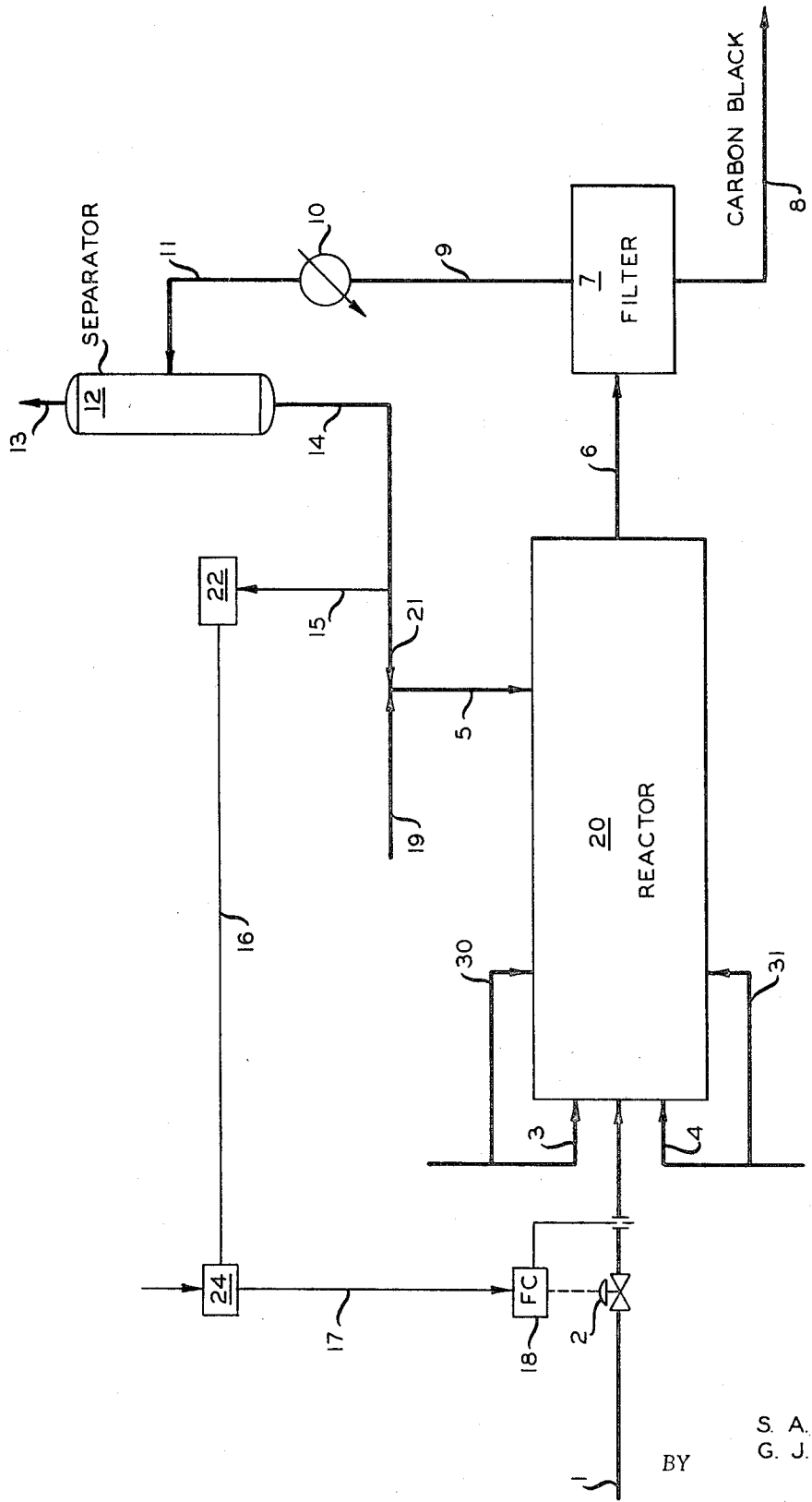

3,592,598
QUALITY CONTROL IN CARBON BLACK
PRODUCTION
Sheldon A. Cunningham and Glenn J. Forseth, Phillips,
Tex., assignors to Phillips Petroleum Company
Filed Aug. 23, 1968, Ser. No. 754,819
Int. Cl. C09c 1/50
U.S. Cl. 23—209.4        8 Claims

ABSTRACT OF THE DISCLOSURE

A process for controlling the quality of a carbon black which involves determining the pH of the condensate condensed from the off-gases from the reactor, and adjusting the ratio of air to oil charged to the reactor to produce a constant quality carbon black.

---

This invention relates to carbon black production.

In one of its more specific aspects, this invention relates to the control of the carbon black quality.

Wide varieties of carbon blacks are produced commercially. These blacks are classified in various ways; in one classification, identification is based upon the particle size of the black. Each of the various carbon black types has a specific range of particle sizes, expressed in terms of millimicrons. Particle size, in turn, has been found to be correlative to other properties of the black. The pH of carbon black has been found to be interrelated to the size of the various blacks; however, the pH values of the various size carbon blacks differ to such a minor extent as to make distinction on this basis difficult.

It has now been discovered that the pH of the condensate produced from the water vapor contained in the gases produced with the carbon black varies significantly with carbon black particle size, and it has been discovered that the pH values of the off-gas condensate differ sufficiently from one size black to another to permit the establishment of a control on this basis. It has further been determined that correlations can be established between feedstocks and the pH of the condensate from the off-gases for various blacks produced from the feedstock, on the basis of which the process can be conducted to produce blacks of specific particle size.

According to the method of this invention, there is provided a process for producing carbon black of substantially constant quality, which comprises sensing the pH of the condensate condensed from the smoke and adjusting the air-to-hydrocarbon oil ratio of the process responsive thereto to control product quality.

Accordingly, it is object of this invention to provide an improved method for carbon black production.

It is another object of this invention to provide a process for producing a carbon black of relatively constant quality.

The method of this invention is applicable to any furnace carbon black process employing a reactor of any configuration in which a hydrocarbon oil is pyrolytically decomposed to produce carbon black. Generally, the reaction is terminated by quenching within the reactor, after which the cool smoke is passed through filters to effect separation of the carbon black from the off-gases, that is, from those gases produced during the course of the reaction.

This invention contemplates cooling some representative portion of the gases formed during the process to effect condensation of some part of the water vapor contained therein and sensing the pH of that condensate. This invention further contemplates an adjustment of the oil rate to the reactor, in response to that pH measurement, to adjust the air-to-oil ratio in order to maintain the carbon black product within the desired particle size range.

The oil rate which is adjusted to alter the air-to-oil ratio will preferably be the rate of that oil which is introduced into the reactor for the purpose of forming the principal reactant mass. However, to some extent, adjustment may be made to any oil stream which is introduced into the reactor, whether such oil stream is introduced primarily as a reactant from which the carbon black is produced, or as fuel to facilitate the pyrolytic decomposition. Similarly, adjustment may be made to a combination of such oil streams as may be introduced into the reactor.

The air rate can also be adjusted to change the air-oil ratio, and if this method is employed, it is preferable that the rate of that air introduced into the reactor peripheral to the first-formed reaction mass be adjusted, in contrast to the rate of that air introduced to form the first reactant mass. In this instance, the fuel introduced in conjunction with that air introduced peripherally to the first-formed reactant mass should preferably be adjusted to maintain the original air-to-fuel ratio, this being so even if make-oil is employed as fuel.

It will be appreciated that adjustment to the air-oil ratio can also be effected by any combination of changes to both the air rate and the oil rate.

The smoke and the off-gases are generally similar, differing principally in that the smoke contains carbon black; the off-gases are gases from which the carbon black has been removed and to which water has been added. Both contain nitrogen, hydrogen, oxides of carbon, light hydrocarbons, and water capor.

In the normal carbon black process, sufficient water is added to the smoke to cool the gases and terminate the pyrolytic reaction, the water remaining in the smoke as vapor. After separation of the carbon black, the off-gases can be cooled to effect condensation of the water vapor therein, the water then being recycled to the process. The method of this invention involves measurement of the pH of the condensate obtained from the quenched smoke or condensate obtained from the unquenched smoke. This condensate is routed to a pH determining mechanism, a signal therefrom being established to reset the oil or the air rate to the reactor to control the air-to-oil ratio, thereby adjusting the particle size of the carbon black.

The method of this invention will be more easily understood by referring to the attached drawing which shows a simple schematic view of the process of this invention in which the condensate is obtained after the smoke is quenched. It will be explained in terms of adjusting the rate of that oil introduced to form the primary reactant mass inasmuch as this method of control is the simplest.

In the figure, there is shown reactor 20 to which oil is provided through conduit 1 having control valve 2 located therein. Also opening into reactor 20 are fuel conduit 3 and air conduit 4. It will be understood that these conduits may open into reactor 20 at any conventional point, as for example, through conduits 30 and 31.

Water is introduced into reactor 20 through conduit 5 to quench the reaction, this water entering either as recycle through conduit 21, or as fresh water through conduit 19. The cooled smoke from reactor 20 enters filter 7 through conduit 6. In filter 7, separation is made between the off-gases and the carbon black, the carbon black leaving the filter through conduit 8.

The off-gases, containing a considerable portion of water, pass overhead from the filter through conduit 9 and through cooler 10, wherein some portion of the water vapor is condensed and passes with the off-gases through conduit 11 into separator 12. The off-gases and uncondensed water vapor pass overhead through conduit 13. The water separated in separator 12 passes through lines 14 and 21 into line 5 and is recycled into reactor 20.

Of that water passing through conduit 14, some portion is diverted through line 15 into the pH determination instrument 22. Instrument 22 senses the pH of the condensate and transmits a signal representative of the pH through line 16 to controller 24 which resets flow controller 18 through instrument line 17 to adjust valve 2. Valve 2 adjusts the oil rate through conduit 1 into reactor 20 to adjust the air-to-oil ratio to give the desired pH value as determined by instrument 22, as demanded by the pH set point of controller 24.

The relationship for the various blacks in respect to their particle size and the pH of the condensate from the off-gases will generally correlate approximately as follows:

| Black type | Typical particle size, millimicrons | pH | Typical air/oil ratios |
|---|---|---|---|
| SAF | 11–19 | 3,6–4,3 | 950 |
| ISAF | 20–25 | 5,7–6,0 | 800 |
| HAF | 26–30 | 6,2–6,6 | 550 |
| FEF | 40–48 | 6,7–6,9 | 450 |

The above relationships will be found to apply generally. However, it is possible in each individual instance, to determine the relationship for the individual feedstock, or make-oil, employed. Determinations of this nature are further advisable for each individual stock inasmuch as the acidity of the water condensed from the off-gases will vary to some extent with the components contained in the off-gases which, in turn, will vary with the individual quality of the stock.

The equipment necessary for the determinations involved in the control set forth is readily available on the commercial market.

It will be evident from the above discussion that certain modifications can be made to the process. For example, both the air and the oil rates can be adjusted to change the air-to-oil ratio. Also, a sample of the gas formed during the reaction may be withdrawn from the reactor prior to the quenching of the reaction and the water vapor condensed with the pH determination being made on that condensate and adjustments made in accordance therewith. However, such modifications are not considered as being beyond the scope of this invention.

What is claimed is:

1. A process for controlling the quality of carbon black produced by the pyrolytic decomposition of a hydrocarbon feed in a carbon black furnace, the properties of the carbon black being controlled by the ratio of the quantities of air and hydrocarbon feed introduced into said furnace, said decomposition producing a smoke comprised of particulate carbon black in a gas and water vapor, said smoke being quenched prior to recovery of said carbon black from said smoke which comprises (a) condensing water vapor from said smoke;
(b) sensing the pH value of the condensate; and,
(c) adjusting the ratio of the quantities of air and hydrocarbon feed responsive to said value to control the quality of said carbon black.

2. The process of claim 1 in which the hydrocarbon feed introduction into said furnace is adjusted to adjust said ratio.

3. The process of claim 1 in which the air introduction rate into said furnace is adjusted to adjust said ratio.

4. The process of claim 1 in which the water vapor condensed consists essentially of water formed during said pyrolytic decomposition.

5. The process of claim 1 in which said smoke is quenched with water and the water vapor condensed consists essentially of water formed during said pyrolytic decompositon and of said water employed to quench said smoke.

6. The process of claim 1 in which said carbon black is recovered from said smoke prior to said water vapor being condensed from said smoke.

7. The process of claim 1 in which a portion of said condensate is introduced into said furnace to quench said smoke.

8. The process of claim 1 in which the air introduction rate into said furnace is adjusted to adjust said ratio, and the water vapor condensed to form condensate consists essentially of water formed during said pyrolytic decomposition and a portion of said condensate is introduced into said furnace to quench said smoke, said carbon black being recovered from said smoke prior to said water vapor being condensed and a portion of said condensate is introduced into said furnace to quench said smoke.

References Cited
UNITED STATES PATENTS

| | | | |
|---|---|---|---|
| 2,953,436 | 9/1960 | Kron | 23—209.6 |
| 3,005,688 | 10/1961 | Williams | 23—259.5 |
| 3,390,960 | 7/1968 | Forseth | 23—209.4 |
| 3,471,260 | 10/1969 | Lehr et al. | 23—209.4 |

EDWARD S. MEROS, Primary Examiner

U.S. Cl. X.R.

23—209.6, 230, 259.5